(12) United States Patent
Bajekal et al.

(10) Patent No.: US 10,654,588 B2
(45) Date of Patent: May 19, 2020

(54) ROTOR WIRELESS LOAD AND MOTION MONITORING SENSOR NETWORK

(71) Applicant: Sikorsky Aircraft Corporation, Stratford, CT (US)

(72) Inventors: Sanjay Bajekal, Simsbury, CT (US); Brian Dean Bouquillon, Fort Worth, TX (US); Cagatay Tokgoz, South Windsor, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 19 days.

(21) Appl. No.: 15/301,104

(22) PCT Filed: Mar. 26, 2015

(86) PCT No.: PCT/US2015/022725
§ 371 (c)(1),
(2) Date: Sep. 30, 2016

(87) PCT Pub. No.: WO2015/191144
PCT Pub. Date: Dec. 17, 2015

(65) Prior Publication Data
US 2017/0050745 A1    Feb. 23, 2017

Related U.S. Application Data

(60) Provisional application No. 61/974,124, filed on Apr. 2, 2014.

(51) Int. Cl.
*B64D 45/00*     (2006.01)
*B64C 27/06*     (2006.01)
(Continued)

(52) U.S. Cl.
CPC ........ *B64D 45/0005* (2013.01); *B64C 27/008* (2013.01); *B64C 27/06* (2013.01);
(Continued)

(58) Field of Classification Search
None
See application file for complete search history.

(56) References Cited

U.S. PATENT DOCUMENTS

| 5,668,562 A | 9/1997 | Cutrer et al. |
| 8,131,210 B2 | 3/2012 | Couper |

(Continued)

FOREIGN PATENT DOCUMENTS

EP    2662741 A2    11/2013

OTHER PUBLICATIONS

International Search Report and Written Opinion for International Application No. PCT/US2015/22725, dated Dec. 21, 2015; 14 pages.

(Continued)

*Primary Examiner* — Adam D Tissot
(74) *Attorney, Agent, or Firm* — Cantor Colburn LLP

(57) ABSTRACT

A method of data collection from a rotor system of an aircraft includes positioning a plurality of sensors at a plurality of locations of a rotating portion of the rotor system. One or more antennae are located at one or more rotationally fixed locations of the aircraft. Rotor system data is collected via the sensors and is wirelessly transmitted from the sensors to the antennae and is transferred from the antennae to a gateway where it is normalized and synchronized. In another embodiment, a data collection system for a rotor includes a plurality of sensors located at rotating locations of the rotor, the sensors configured to collect and wirelessly transmit rotor data. Antennae are located at a fixed location of the aircraft. The antennae are configured to send and receive data from the sensors. A gateway is connected to the antennae to normalize and synchronize the rotor data.

13 Claims, 4 Drawing Sheets

(51) Int. Cl.
  *G07C 5/08* (2006.01)
  *B64C 27/00* (2006.01)
  *H04Q 9/00* (2006.01)

(52) U.S. Cl.
  CPC ............ *G07C 5/0841* (2013.01); *H04Q 9/00* (2013.01); *B64D 2045/0085* (2013.01); *H04Q 2209/40* (2013.01)

(56) References Cited

U.S. PATENT DOCUMENTS

| | | | |
|---|---|---|---|
| 8,392,747 B2 | 3/2013 | Ferguson et al. | |
| 8,489,348 B2 | 7/2013 | Shirriff et al. | |
| 8,515,712 B1 | 8/2013 | Mookerjee et al. | |
| 8,631,316 B2 | 1/2014 | Patrawala et al. | |
| 2005/0131619 A1* | 6/2005 | Rappaport | G06F 16/50 701/101 |
| 2011/0158806 A1 | 6/2011 | Arms et al. | |
| 2012/0068003 A1 | 3/2012 | Bajekal et al. | |
| 2012/0078544 A1* | 3/2012 | Lynch | B64C 27/008 702/56 |
| 2013/0250845 A1* | 9/2013 | Greene | H04Q 9/00 370/315 |
| 2014/0200470 A1* | 7/2014 | Puolakanaho | A61B 5/0002 600/509 |

OTHER PUBLICATIONS

EP Communication; Extended European Search Report; Application No. 15806665.4-1754/3126233 PCT/US2015022725; dated Sep. 27, 2017; pp. 1-7.

PCT international Preliminary Report on Patentability; International Application No. PCT/US2015/022725; International Filing Date: Mar. 26, 2015; dated Oct. 4, 2016; pp. 1-7.

* cited by examiner

ROTOR WIRELESS LOAD AND MOTION MONITORING SENSOR NETWORK

FEDERAL RESEARCH STATEMENT

This invention was made with government support with the United States Army under Contract No. W911W6-10-2-0006. The government therefore has certain rights in this invention.

CROSS-REFERENCE TO RELATED APPLICATIONS

This application is a National Phase Application of Patent Application PCT/US2015/022725 filed on Mar. 26, 2015, the contents of which are incorporated herein by reference in its entirety.

BACKGROUND

The present disclosure relates to rotary winged aircraft. More specifically, the present disclosure relates to health assessment of rotor systems of a rotary wing aircraft.

Unlike airframe airspeeds and inertial motion, there is limited visibility into specific loads and motions to which rotor system components are subjected. Such information would be useful for health assessment and management of the rotor system components, as well as for flight controls and as historical data for future design improvements.

Current practice in rotor health monitoring consists primarily of periodic visual inspections. These inspections are augmented with continuous rotor track and balance (RTB) monitoring in health and usage monitoring system (HUMS)-equipped rotorcraft. Physical sensors located within the rotating system would significantly enhance rotor health monitoring, thereby reducing the rotor system maintenance burden. Further, the ability to measure key rotor loads on operational rotorcraft would provide the data and insight that may lead to a radical change in the way rotorcraft are designed, qualified, and managed throughout their product life cycle.

The lack of such rotor system measurements is indicative of the perceived difficulties, increased weight, and reliability issues associated with deploying physical sensors within the rotor system and transferring power and data from/to the airframe. First, the use of a wired sensor system with a traditional slip ring, rotary transformer or fiber optic rotary joint to transfer data between rotating and fixed elements tends to be unreliable and requires high maintenance when deployed for long periods of time in harsh environments. Second, the fixed number of channels in these traditional systems limits scalability. Third, a wiring harness would be required to operate in this environment of moving components under forces that test the limits of shielding and connectors over prolonged periods of time.

BRIEF SUMMARY

In one embodiment, a method of data collection from a rotor system of an aircraft includes positioning a plurality of sensors at a plurality of locations of a rotating portion of the rotor system. One or more antennae are located at one or more rotationally fixed locations of the aircraft. Rotor system data is collected via the plurality of sensors and is wirelessly transmitted from the plurality of sensors to the one or more antennae. The rotor system data is transferred from the one or more antennae to a gateway and is normalized and synchronized at the gateway.

Additionally or alternatively, in this or other embodiments the rotor system data is transmitted from the plurality of sensors to the one or more antennae via two or more separate wireless protocols and is normalized at the gateway to a common data format.

Additionally or alternatively, in this or other embodiments missing or incomplete blocks of rotor system data are filled at the gateway.

Additionally or alternatively, in this or other embodiments the one or more antennae are positioned based on a result of analysis of radio frequency signal strength utilizing an electromagnetic simulation.

Additionally or alternatively, in this or other embodiments the processed rotor system data is transmitted from the gateway to an aircraft health monitoring system.

The method of any of claims 1-5, further comprising positioning one or more antennae at a top deck of the aircraft.

Additionally or alternatively, in this or other embodiments the plurality of sensors is utilized to measure characteristics of rotor system loads.

In another embodiment, a data collection system for a rotor of an aircraft includes a plurality of sensors located at a plurality of rotating locations of the rotor, the sensors configured to collect and wirelessly transmit rotor data. One or more antennae are located at a fixed location of the aircraft, relative to the rotating rotor. The one or more antennae are configured to wirelessly send data to and receive data from the plurality of sensors. A gateway is operably connected to the one or more antennae and is configured to normalize and synchronize the rotor data received from the one or more antennae.

Additionally or alternatively, in this or other embodiments the rotor data is transmitted from the plurality of sensors to the one or more antennae via two or more separate wireless protocols. The gateway is configured to normalize the rotor data to a common data format.

Additionally or alternatively, in this or other embodiments the gateway is configured to fill missing or incomplete blocks of rotor data.

Additionally or alternatively, in this or other embodiments the one or more antennae are positioned based on a result of analysis of radio frequency signal strength utilizing an electromagnetic simulation.

Additionally or alternatively, in this or other embodiments the gateway is configured to transmit the rotor data from the gateway to an aircraft health monitoring system.

Additionally or alternatively, in this or other embodiments the one or more antennae are positioned at a top deck of the aircraft.

Additionally or alternatively, in this or other embodiments the plurality of sensors is configured to measure characteristics of rotor loads.

In yet another embodiment, a rotary wing aircraft includes an airframe and a rotor system operably connected to the airframe and rotatable relative to the airframe about a rotor axis. A rotor data collection system includes a plurality of sensors located at a plurality of rotating locations of the rotor system, the sensors configured to collect and wirelessly transmit rotor data. One or more antennae are located at the airframe, and are configured to wirelessly send data to and receive data from the plurality of sensors. A gateway is positioned at the airframe and is operably connected to the one or more antennae. The gateway is configured to normalize and synchronize the rotor data received from the one or more antennae.

Additionally or alternatively, in this or other embodiments the rotor data is transmitted from the plurality of sensors to the one or more antennae via two or more separate wireless protocols, and the gateway is configured to normalize the rotor data to a common data format.

Additionally or alternatively, in this or other embodiments the gateway is configured to fill missing or incomplete blocks of rotor data.

Additionally or alternatively, in this or other embodiments the one or more antennae are positioned based on a result of analysis of radio frequency signal strength utilizing an electromagnetic simulation.

Additionally or alternatively, in this or other embodiments the gateway is configured to transmit the rotor data from the gateway to an aircraft health monitoring system.

Additionally or alternatively, in this or other embodiments the one or more antennae are positioned at a top deck of the airframe.

These, and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
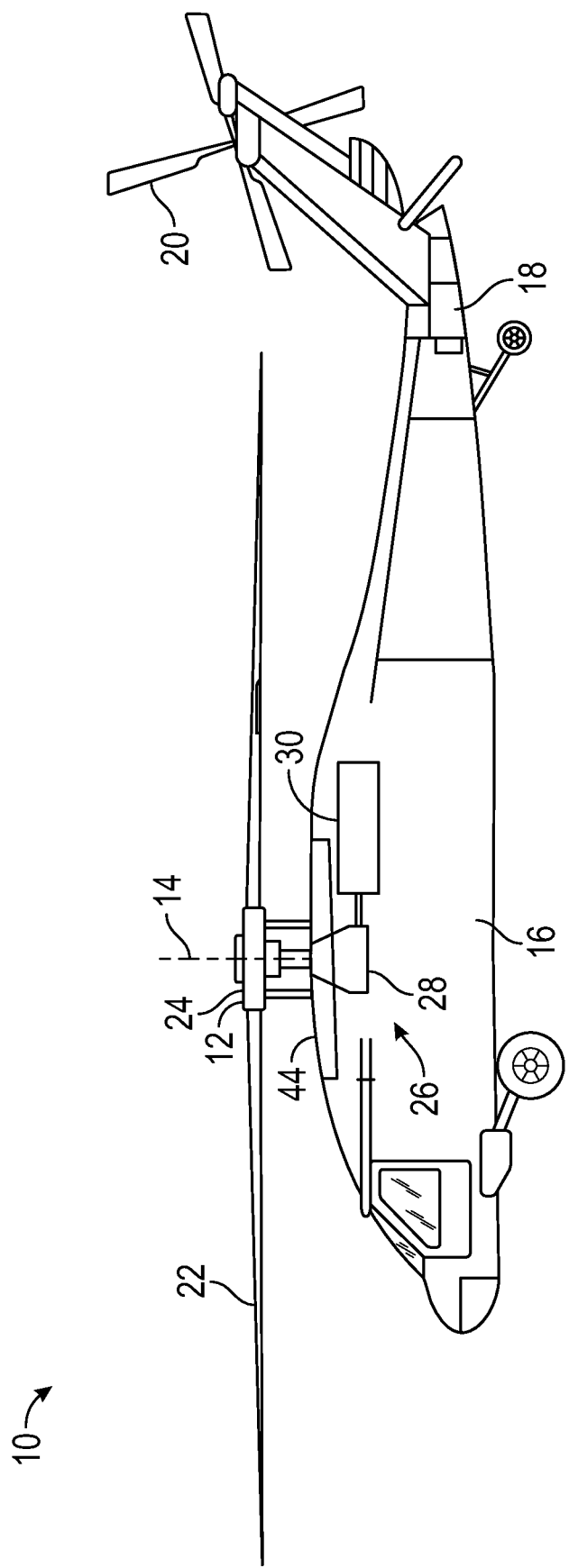
FIG. 1 is a general side view of an exemplary rotary wing aircraft for use in accordance with embodiments.

FIG. 1 illustrates an exemplary rotary-winged aircraft 10 having a main rotor system 12, which rotates about a rotor axis 14. The aircraft 10 includes an airframe 16 which supports the main rotor system 12 as well as an extending tail 18 including a tail rotor 20. The main rotor system 12 includes a plurality of rotor blade assemblies 22 mounted to a rotor hub assembly 24. The main rotor system 12 is driven by a transmission 26. The transmission 26 includes a main gearbox 28 driven by one or more engines, illustrated schematically at 30. The main gearbox 28 and engines 30 are considered as part of the non-rotating frame of the aircraft 10. In the case of a rotary wing aircraft, the main gearbox 28 may be interposed between one or more gas turbine engines 30 and the main rotor system 12. Although a particular rotary wing aircraft configuration is illustrated and described in the disclosed non-limiting embodiment, other configurations and/or machines with rotor systems are within the scope of the present invention. Further, one skilled in the art will readily appreciate that the present disclosure may be utilized in other, non-rotary winged aircraft applications.

Figure 2:
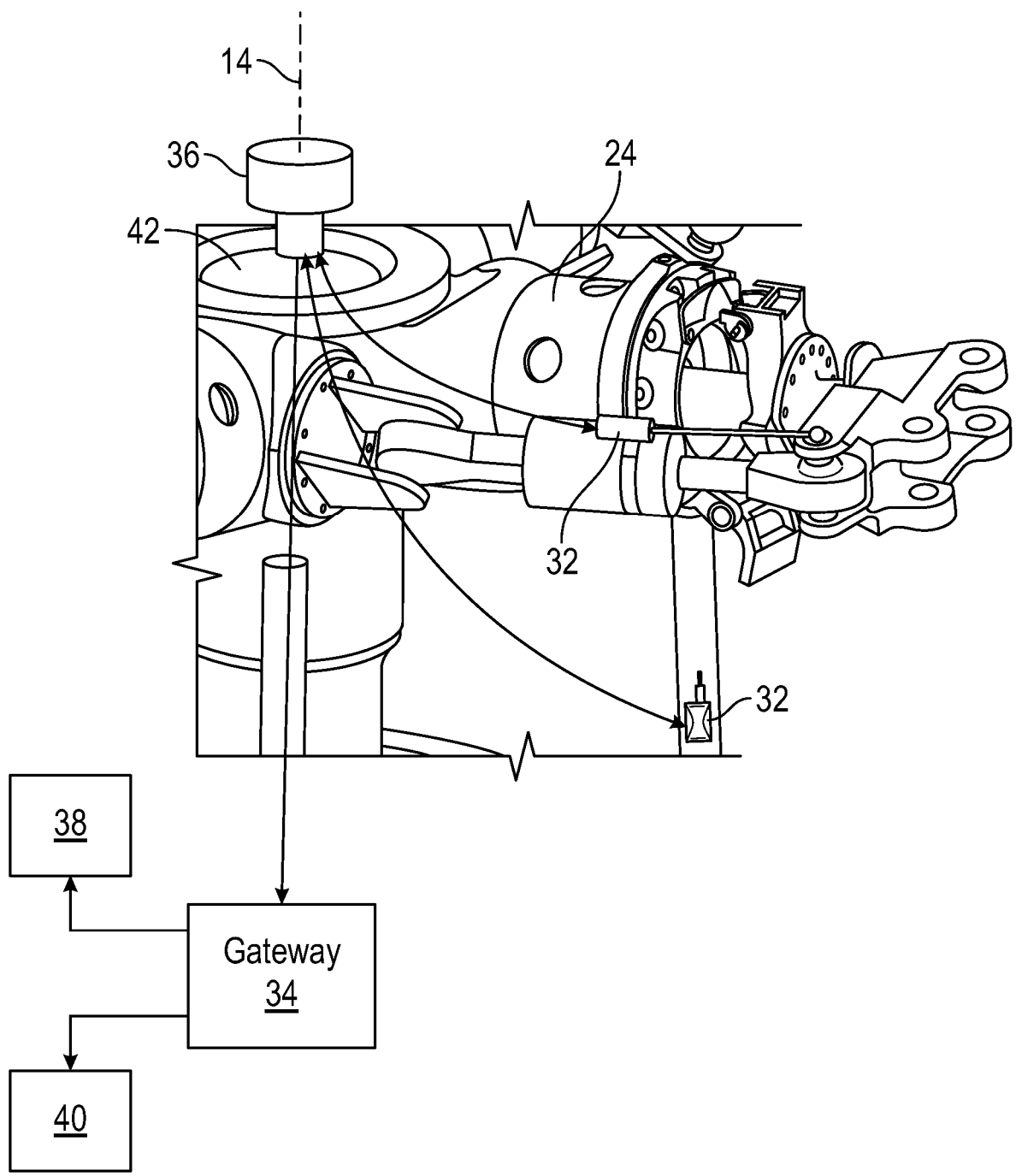
FIG. 2 is a schematic view of an exemplary data collection system for an aircraft rotor.

Referring now to FIG. 2, the main rotor system 12 includes a plurality of self-powered embedded sensors 32 located at selected components of the main rotor system 12, for example, at bearings, dampers, push rods, rod ends, and other components of the rotor hub 24 and/or rotor blade assemblies 22. The sensors are positioned and configured to measure characteristics of the main rotor system 12 such as rotor blade pitch, rotor blade flap, rotor blade lag, and characteristics associated with rotor bearings including spherical bearing centrifugal loads, flap shear and lag shear loads, and pitch, flap and lag moments at a bearing focal point. One skilled in the art will readily appreciate, however, that additional sensors to measure other characteristics of the rotor system may be utilized.

Figure 3:
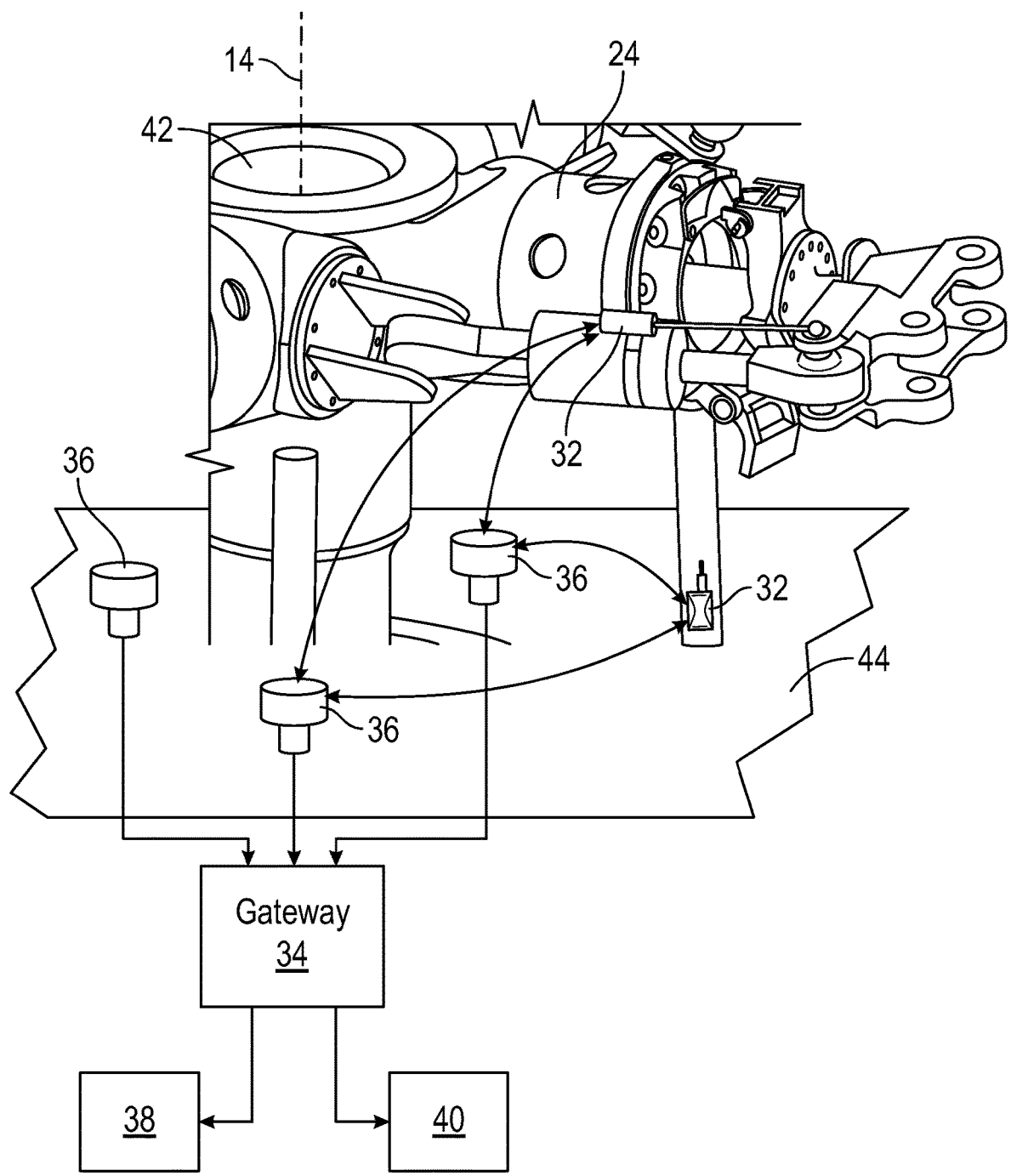
FIG. 3 is a schematic view of another exemplary data collection system for an aircraft rotor.

Referring to FIG. 2, in one embodiment, a single antenna 36 is located at a fixed standpipe 42 of the aircraft 10, while in another embodiment shown in FIG. 3, multiple antennae 36 are utilized and are located at, for example, a top deck 44 of the airframe 16 below the main rotor system 12. For example, three antennae 36 may be located at the top deck 44 equally spaced about the rotor axis 14 as shown in FIG. 3. Alternatively, the antenna 36 may be located remotely from the main rotor system 12 at, for example, the extending tail 18 of the aircraft 10. It is to be appreciated that other antennae 36 locations and quantities of antennae 36 are contemplated within the scope of the present disclosure.

The sensors 32 are wirelessly connected to a gateway 34, which processes data collected by the sensors 32. Wireless data communications between sensors 32 and the gateway 34 occurs via one or more antennae 36, located at a non-rotating portion of the aircraft 10. After processing the data, the gateway 34 passes the processed data to any of a number of aircraft 10 systems, such as an aircraft control system 38 and/or an aircraft health monitoring system 40, as illustrated in FIG. 2.

Successful, reliable, transmission of the data from the sensors 32 to the antennae 36 and through the gateway 34 requires a reliable wireless network. Sensor 32 placement is determined by the sensing need, so optimization of the wireless network between the sensors 32 and the antennae 36 is based on antenna 36 placement. To determine optimal antenna 36 placement, a physics-based approach, in one embodiment, electromagnetic simulation software, is utilized to determine antenna 36 placement. In one embodiment, the electromagnetic simulation software evaluates an RF signal strength for the wireless channel between the antennae 36 and sensors 32 placed at selected components of the main rotor system 12.

Figure 4:
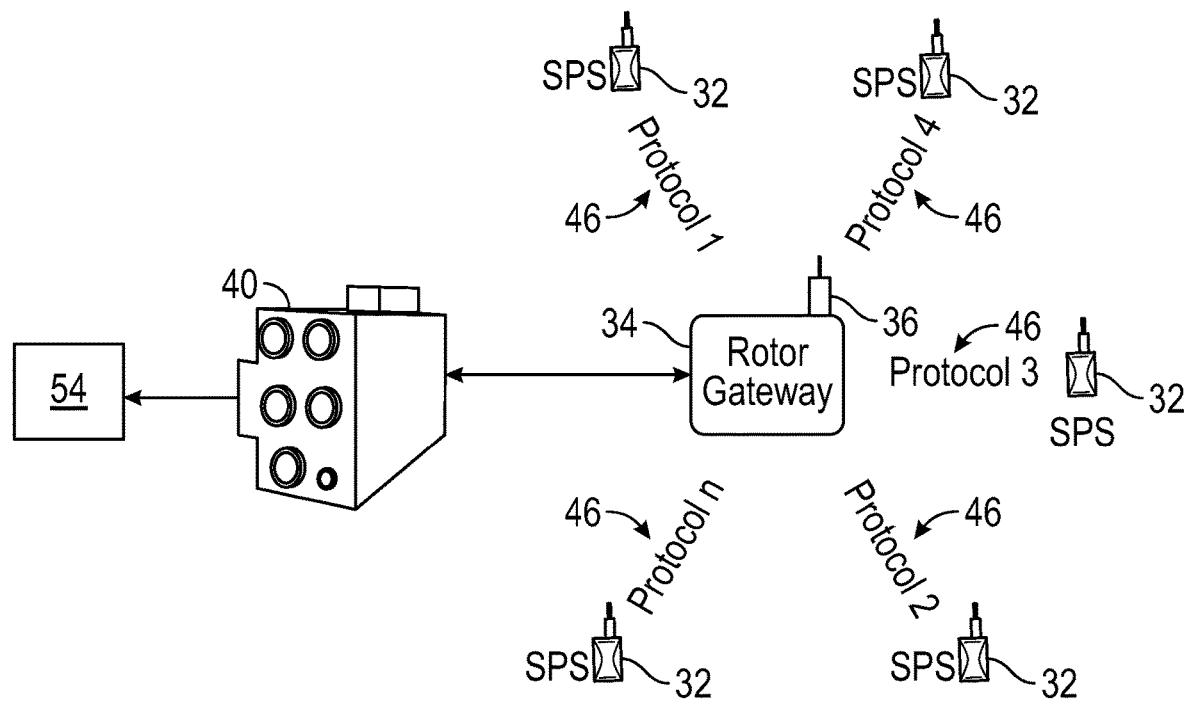
FIG. 4 is a schematic view of yet another exemplary data collection system for an aircraft rotor.
Figure 5:
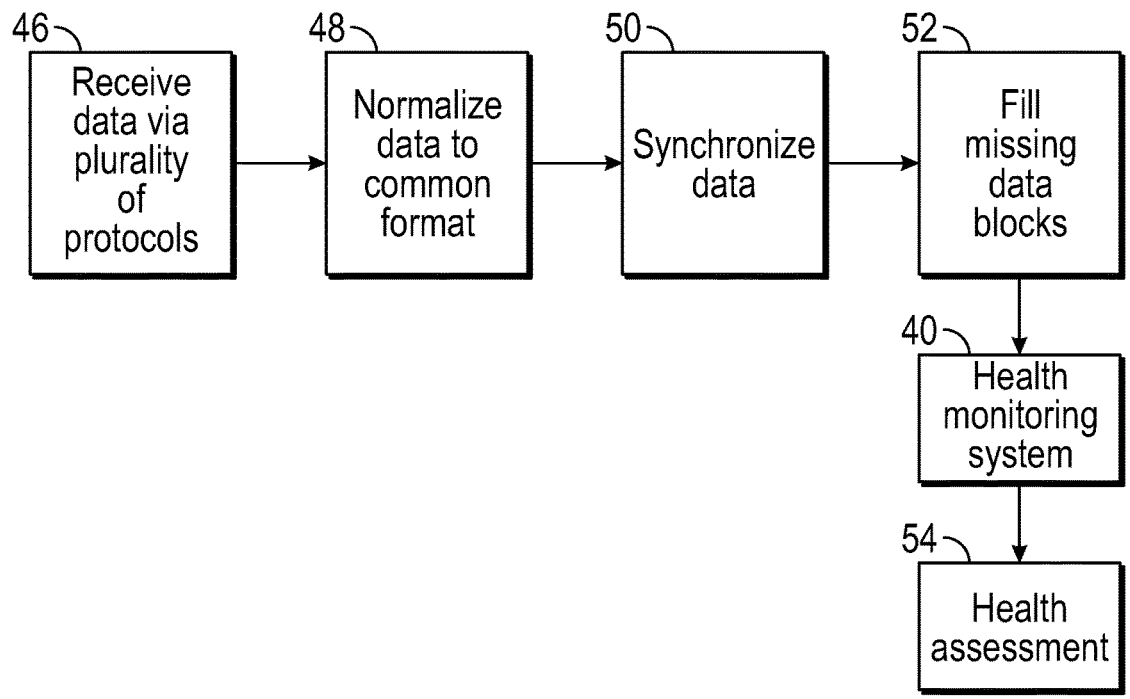
FIG. 5 is a schematic view of an exemplary data gateway.

Referring now to FIG. 4, sensors 32 may communicate sensed data to the antennae 36 via a plurality of wireless protocols 46, depending on sensor 32 type, manufacturer, or other factors. Thus, the gateway 34 must be configured to receive and process data via the plurality of protocols 46. More particularly, as shown schematically in FIG. 5, the gateway 34 receives the data over the plurality of wireless protocols 46, normalizes the data into a common format at block 48, and synchronizes the normalized data at block 50. In some embodiments, the gateway 34 assesses the data for missing or incomplete data blocks, and fills in the missing data at block 52 utilizing data completion or interpolation algorithms.

Once the data is normalized, synchronized, completed and/or otherwise processed at the gateway 34, the gateway 34 transmits the data 54 to aircraft systems, including the aircraft health monitoring system 40. The health monitoring system 40 assesses the data and outputs a health assessment 56 of the main rotor system 12.

The wireless network and gateway described herein provide for reliable collection, transfer and processing of data for timely and accurate assessment of main rotor system health. Such assessment allows for reliable diagnosis and correction of rotor system faults thus improving aircraft safety and reducing maintenance costs.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of data collection from a rotor system of an aircraft comprising:
    disposing a plurality of sensors at a plurality of locations of a rotating portion of the rotor system;
    positioning one or more antennae at one or more rotationally fixed locations of the aircraft, the fixed locations of the one or more antennae being optimized via an electromagnetic simulation software operable to evaluates radio frequency signal strength for a wireless channel between the one or more antennae and the plurality of sensors;
    positioning a gateway at the airframe, the gateway being operably connected to the one or more antennae;
    collecting rotor system data via the plurality of sensors;
    wirelessly transmitting the rotor system data from the plurality of sensors to the one or more antennae via two or more separate wireless protocols;
    transferring the rotor system data from the one or more antennae to a gateway;
    normalizing the rotor system data into a common format at the gateway;
    synchronizing the rotor system data at the gateway; and
    providing the synchronized rotor system data from the gateway to one or more aircraft systems including a health monitoring system.

2. The method of claim 1, further comprising:
    normalizing the rotor system data at the gateway to a common data format.

3. The method of claim 1, further comprising filling missing or incomplete blocks of rotor system data at the gateway.

4. The method of claim 1, further comprising transmitting the processed rotor system data from the gateway to an aircraft health monitoring system.

5. The method of claim 1, further comprising positioning one or more antennae at a top deck of the aircraft.

6. The method of claim 1, further comprising utilizing the plurality of sensors to measure characteristics of rotor system loads.

7. A data collection system for a rotor of an aircraft, comprising:
    a plurality of sensors located at a plurality of rotating locations of the rotor, the sensors configured to collect and wirelessly transmit rotor data;
    one or more antennae disposed at a fixed location of the aircraft, relative to the rotating rotor, the fixed locations of the one or more antennae being optimized via an electromagnetic simulation software operable to evaluate radio frequency signal strength for a wireless channel between the one or more antennae and the plurality of sensors, the one or more antennae is configured to wirelessly send data to and receive data from the plurality of sensors, wherein the rotor data is transmitted from the plurality of sensors to the one or more antennae via two or more separate wireless protocols;
    a gateway mounted to the airframe and operably connected to the one or more antennae, the gateway configured to normalize the rotor data into a common format and synchronize the rotor data received from the one or more antennae; and
    a health monitoring system operably coupled to the gateway and configured to receive the synchronized rotor data from the gateway.

8. The system of claim 7, wherein the gateway is configured to fill missing or incomplete blocks of rotor data.

9. The system of claim 7, wherein the one or more antennae are positioned at a top deck of the aircraft.

10. The system of claim 7, wherein the plurality of sensors are configured to measure characteristics of rotor loads.

11. A rotary wing aircraft comprising:
    an airframe;
    a rotor system operably connected to the airframe and rotatable relative to the airframe about a rotor axis; and
    a rotor data collection system including:
        a plurality of sensors located at a plurality of rotating locations of the rotor system, the sensors configured to collect and wirelessly transmit rotor data;
        one or more antennae disposed at fixed locations about the airframe, the fixed locations being optimized via an electromagnetic simulation software that evaluates radio frequency signal strength for a wireless channel between the one or more antennae and the plurality of sensors, the one or more antennae is configured to wirelessly send data to and receive data from the plurality of sensors, wherein the rotor data is transmitted from the plurality of sensors to the one or more antennae via two or more separate wireless protocols;
        a gateway disposed at the airframe and operably connected to the one or more antennae, the gateway configured to normalize the rotor data into a common format and synchronize the rotor data received from the one or more antennae; and
    a health monitoring system operably coupled to the gateway and configured to receive the synchronized rotor data from the gateway.

12. The aircraft of claim 11, wherein the gateway is configured to fill missing or incomplete blocks of rotor data.

13. The aircraft of claim 11, wherein the one or more antennae are positioned at a top deck of the airframe.

* * * * *